United States Patent [19]

Heitmann

[11] 4,232,330
[45] Nov. 4, 1980

[54] METHOD AND SYSTEM FOR SEPARATING THE CHROMINANCE AND LUMINANCE SIGNALS IN COLOR TELEVISION SIGNALS HAVING QUADRATURE-MODULATED CHROMINANCE SUBCARRIERS

[75] Inventor: Jürgen Heitmann, Seeheim, Fed. Rep. of Germany

[73] Assignee: Robert Bosch GmbH, Stuttgart, Fed. Rep. of Germany

[21] Appl. No.: 16,990

[22] Filed: Mar. 2, 1979

[30] Foreign Application Priority Data

Mar. 11, 1978 [DE] Fed. Rep. of Germany ....... 2810697

[51] Int. Cl.³ ............................................. H04N 9/535
[52] U.S. Cl. .................................................... 358/31
[58] Field of Search .............................. 358/21, 31, 39

[56] References Cited

U.S. PATENT DOCUMENTS 4,178,609   12/1979   Beutel .................................... 358/31

Primary Examiner—Robert L. Richardson

Attorney, Agent, or Firm—Frishauf, Holtz, Goodman & Woodward

[57] ABSTRACT

A comb filter filters the luminance signal and a difference signal indicative of the difference in signal content between two sequential lines. A low-pass filter furnishes a low frequency luminance signal having only the low frequency components of the luminance signal. The low frequency signal is applied to a horizontal aperture correction circuit which furnishes substitute high frequency signals. The low frequency luminance signal and the substitute high frequency signals are applied to one input of a fade-in fade-out circuit whose other input receives the luminance signal. The ratio of signals at the output of the fade-in fade-out circuit is controlled by a correlation signal derived from the difference signal. In the digital embodiment, the fade-in fade-out circuit receives the luminance signal and the substitute high frequency signals only and the low frequency luminance signal is added to the output of the fade-in fade-out circuit. The chrominance signals are derived by synchronous detection from the difference signal.

20 Claims, 3 Drawing Figures

| | 56 ns | 56 ns | 56 ns | 56 ns | Condition for Correlation or Example for Non-Correlation respectively |
|---|---|---|---|---|---|
| line a | $Y_{a1}+(U+V)_{a1}$ | $Y_{a2}+(U-V)_{a2}$ | $Y_{a3}-(U+V)_{a3}$ | $Y_{a4}-(U-V)_{a4}$ | |
| line b | $Y_{b1}-(U+V)_{b1}$ | $Y_{b2}+(U-V)_{b2}$ | $Y_{b3}+(U+V)_{b3}$ | $Y_{b4}-(U-V)_{b4}$ | |
| (a+b) | $\underline{2Y}$ | $2Y+2(U-V)$ | $\underline{2Y}$ | $2Y-2(U-V)$ | $\left.\begin{array}{l}Y_a=Y_b \quad U_a=U_b \\ \quad\quad\quad\quad\; V_a=V_b\end{array}\right\}$ |
| (a−b) | $2(U+V)$ | $\underline{0}$ | $-2(U+V)$ | $\underline{0}$ | |
| (a+b)' | $2Y-(U+V)_{a1}$ | $2Y+(U-V)_{a3}$... wait | $2Y+(U+V)_{a3}$ | | |
| (a−b)' | | $-(U-V)_{a2}$ | | $+(U-V)_{a4}$ | $\left.\begin{array}{l}(U+V)_b=2(U+V)_a \\ (U-V)_b=2(U-V)_a\end{array}\right\}$ |

FIG. 3

METHOD AND SYSTEM FOR SEPARATING THE CHROMINANCE AND LUMINANCE SIGNALS IN COLOR TELEVISION SIGNALS HAVING QUADRATURE-MODULATED CHROMINANCE SUBCARRIERS

The present invention relates to methods and systems for separating the luminance and the chrominance signals from a color television signal having a quadrature-modulated chrominance subcarrier.

BACKGROUND AND PRIOR ART

Systems of the above-described type are known in which comb filters are used. However, a comb filter only operates exactly when two time sequential lines of the television signal have the same signal content. If the correlation between the signal content of two time sequential lines is poor, parts of the chrominance signals will remain in the luminance signal thereby causing so-called cross-luminance disturbances. DT-OS No. 2,615,023 discloses a system in which a band rejection filter is connected to the output of the comb filter furnishing the luminance signal and the filtering effect is controlled in such a manner that it becomes more and more pronounced the more difference exists in the chrominance information of two time sequential lines. It is, however, very difficult to design and construct the band rejection filter having the required transfer characteristic.

THE INVENTION

It is an object of the present invention to furnish a method and system for separating the luminance signals from the color television signal in which the above-mentioned disturbances are eliminated or greatly decreased and which is constructed in a particularly simple manner.

According to the present invention, filter means are provided which have an input connected to receive the composite color television signal and which furnish a main luminance signal having at least the high frequency components of the luminance signal at a first filter output, a difference signal indicative of the difference in signal content between time sequential lines of said color television signal at a second filter output, and a low frequency luminance signal having only the low frequency components of the luminance signal at a third filter output. Further furnished are combining means which have a first input connected to the first filter output, a second output connected to the third filter output and a control input connected to the second filter output for combining the main luminance signal and the low frequency luminance signal in a ratio controlled by said difference signal. The so-combined luminance signals constitute the final luminance signal having no undesired chrominance signal components.

In a particularly preferred embodiment, means are provided for furnishing substitute high frequency signals in response to the low frequency luminance signal and the combining means comprises means for first combining the main luminance signal and the substitute high frequency signals in a ratio controlled by said correlation signal and adder means for adding said low frequency luminance signal to the so-combined signals.

DRAWING ILLUSTRATING A PREFERRED EMBODIMENT

FIG. 3 is a table of signal values at different points of the systems of FIGS. 1 and 2.

Figure 1:
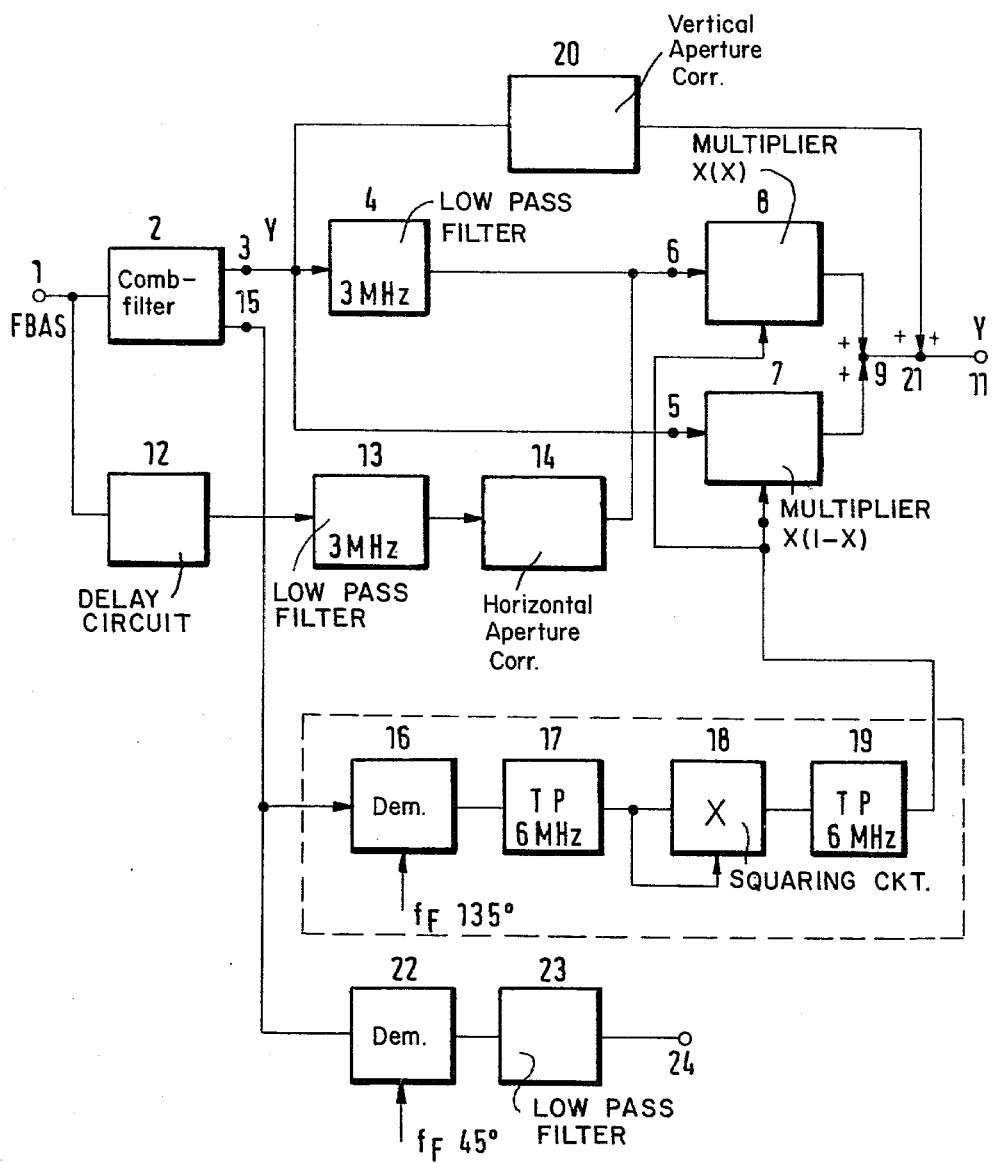
FIG. 1 is a schematic diagram of an analog embodiment of the present invention.

A composite color television signal (FBAS) is applied to terminal 1 in FIG. 1.

A comb filter 2 is connected to terminal 1. This filter is described in, for example, DBP No. 1813954 which is hereby incorporated by reference. The filter will therefore not be described in greater detail here, but it furnishes the luminance signal Y separated from the composite color television signal at an output 3. This luminance signal is herein referred to as the main luminance signal. Signal Y is directly applied to the input 5 of a variable gain amplifier 7 and, through a low-pass filter 4 to the input 6 of a variable gain amplifier 8. Amplifiers 7 and 8 and adder circuit 9 together form a fade-in fade-out circuit.

The mixing ratio created by the fade-in fade-out (fader) circuit varies between two extreme values. For the first extreme value the amplification of amplifier 8 is 0 while that of amplifier 7 is 1. The second extreme values occurs when amplifier 8 has an amplification factor of 1 while amplifier 7 has a 0 amplification. The output signals of the two amplifiers are added to each other in adder circuit 9 and the resultant sum is available at a terminal 11 which constitutes the output terminal of the system.

Low-pass filter 4 has a limiting frequency of approximately 3 MHz. This limiting of the bandwidth of the luminance signal causes a decreases in the sharpness of the television picture. For this reason an aperture correction signal is added to the signal at input 6 of amplifier 8 for purposes of contour enhancement. Specifically, the composite television signal at terminal 1 is fed through a delay circuit 12, which equalizes the transit times and which may also be a part of filter 2, via a low-pass filter 13 which also has a limiting frequency of 3 MHz to a horizontal aperture correction circuit 14. The output of the horizontal aperture circuit is applied to input 6 of amplifier 8.

The difference between signals derived from two sequential lines of the television signal is availale at output 15 of filter 2. As will be explained in greater detail with reference to FIG. 3, for equal signal values in the two sequential lines this difference will be 0 for particular phases of the chrominance subcarrier. The difference signal available at terminal 15 is therefore subjected to synchronous detection utilizing a chrominance subcarrier of 135° phase angle in detector 16. The output of detector 16 is then a correlation signal which is 0 when the signal content of two sequential lines is the same. Higher frequency components which are created by the synchronous demodulation process are removed in a low-pass filter 17.

For use in the system and method of the present invention the sign of the correlation signal is of no importance. Thus a multiplier 18 is used to form the square of the correlation signal thereby furnishing a magnitude signal which is independent of the sign. A low-pass filter 19 having a cut off frequency of approximately 6 MHz is connected to the output of multiplier circuit 18 in order to supress undesired high frequency components. The output of low-pass filter 19 is a signal x which is applied to the fade-in fade-out circuit.

As previously explained, the signal x=0 when the signal content of two sequential lines (time sequential lines) is the same. The latter is the requirement for a perfect operation of filter 2, so that when x=0 the amplification factor of amplifier 7 is 1 and the luminance signal Y is directly applied to terminal 11. At the same time the amplification factor of amplifier 8 is 0 so that the output signal of low-pass filter 4 and the horizontal aperture correction circuit 14 are blocked from terminal 11.

The value of signal x increases with increasing differances between the signal content of two time sequential lines. At the same time the signal at terminal 3 of filter 2 has increasing cross-luminance disturbances. Therefore the amplification factor of amplifier 7 is decreased while that of amplifier 8 is increased, causing the signal at terminal 11 to have a larger component derived from the output of filter 4 and the horizontal aperture correction circuit 14.

Since cross-luminance disturbances appear mainly in the high frequency range of the video signal, the low frequency part of the video signal can be derived from the luminance signal available at terminal 3 even for lines having poor correlation. However, it is equally possible to apply the output signals of low-pass filter 13 to input 6 of amplifier 8.

In order to increase the sharpness in the vertical direction as well, a circuit 20 for vertical aperture correction may be provided. These circuits are well known. The luminance signal Y is applied to the input of the vertical aperture correction circuit 20, the vertical aperture correction signal generated by circuit 20 being applied to an adder 21 where it is added to the sum of the signals derived from amplifiers 7 and 8 prior to application of the latter to terminal 11.

The difference signal at output terminal 15 of filter 2 is demodulated in a synchronous detector 22 utilizing a chrominance subcarrier of 45° phase angle and a low-pass filter 23 in such a way that an output terminal 24 alternately furnishes the sum and the difference of color difference signals U and V.

Figure 2:
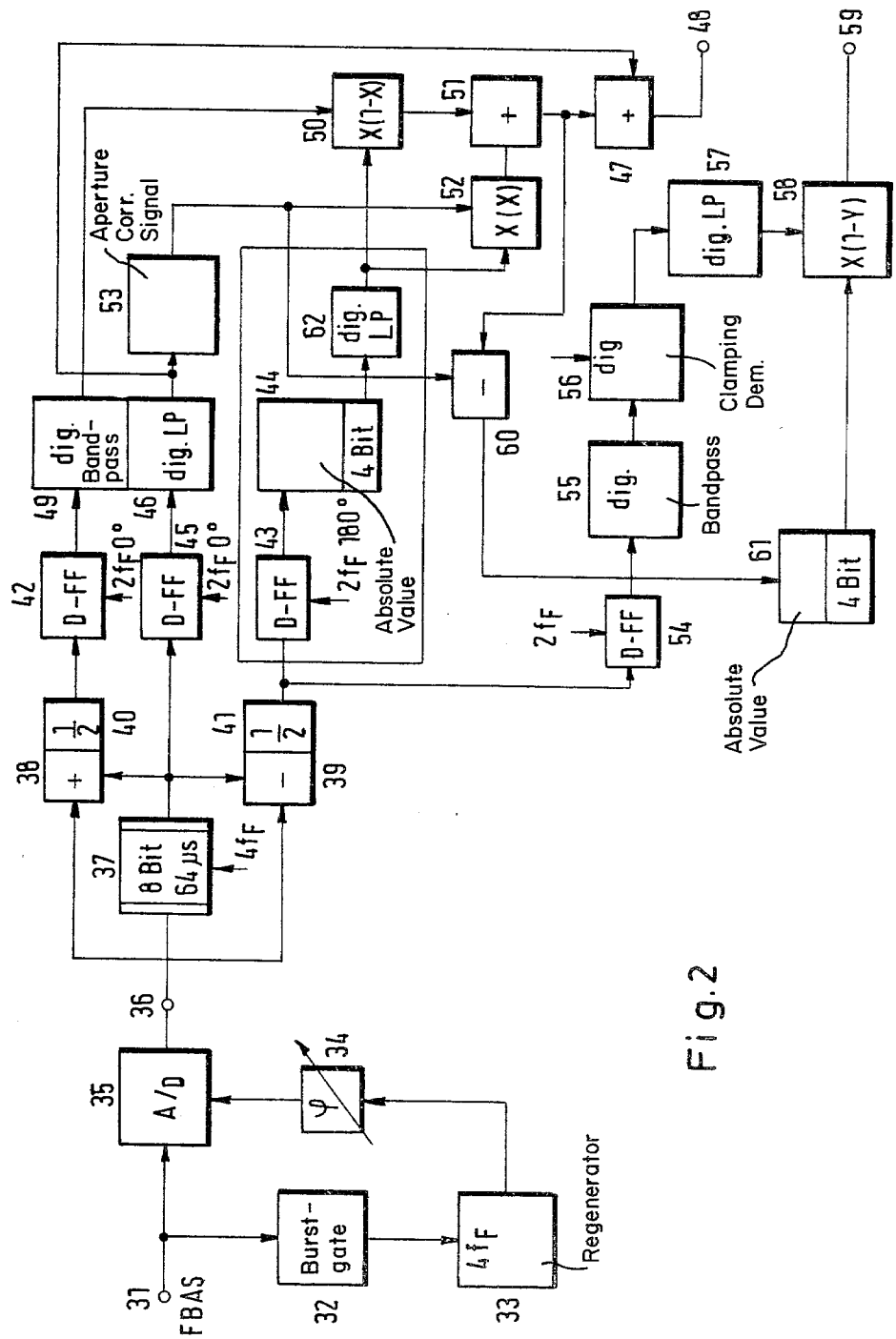
FIG. 2 is a schematic diagram of a digital embodiment of the present invention.

FIG. 2 shows a digital embodiment of the present invention. One known method of changing a composite television signal into a digital signal comprises the scanning of the television signal at four times the chrominance subcarrier frequency. A composite television signal is applied at terminal 31. A gating circuit 32 separates the color bursts. The color bursts are applied to a circuit 33 which furnishes an output signal having a frequency of four times the chrominance subcarrier frequency. The output voltage of circuit 33 is applied to a phase shift circuit 34 whose output signal constitutes the sampling signal applied to an analog/digital converter 35. The output signals of analog/digital converter 35 are digital color television signals which, in a preferred embodiment, have eight parallel bits with a repetition rate of 17.7 MHz for PAL color television systems. These signals are delayed by the time duration of one line in a delay circuit 37 which, in a preferred embodiment, includes eight parallel shift registers. The delayed and the undelayed signals are, respectively, added to and subtracted from each other in circuits 38 and 39. The resultant sum and difference values are divided by a factor of 2 in circuits 40 and 41 respectively.

Referring now to FIG. 3, the signal values in two sequential lines during four scanning periods (56 ns) are represented in lines a and b. The changes in sign result from the nonintegral relationship between line frequency and chrominance subcarrier frequency in the NTSC and PAL color television systems and, for PAL systems additionally from the change in sign of the V component of the chrominance signal.

The output signal of adder circuit 38 (FIG. 2) is shown in line (a+b) of FIG. 3, it being assumed that the signal content of lines a and line b is equal, that is $Y_a=Y_b$, $U_a=U_b$, $V_a=V_b$. It will be noted that for every other sampling time the chrominance signals cancel out and only the luminance signal remains. In the remaining sampling times a mixture of luminance and chrominance occurs which is why an additional delay line is generally provided in comb filters deriving the luminance signal. However, in the system shown in FIG. 2 the chrominance portion is removed by scanning the sum signal at double the chrominance subcarrier frequency so that only every other value shown in line a of FIG. 3 is utilized. This is accomplished in the system shown in FIG. 2 by utilization of a D flip-flop 42.

As shown in line (a−b) the difference between signals of two successive lines is 0 for alternate sampling instances. This however is only true when the signal content of two sequential lines is the same. Thus a signal constituted by the two sampled values will correspond to the correlation of two sequential lines. For this purpose the clock input of D flip-flop 43 receives a 180° phase shifted sampling signal of twice the chrominance subcarrier frequency.

As was already discussed in reference to FIG. 1, the sign of the correlation signal is of no interest. Therefore a circuit 44 is connected to the output of D flip-flop 43 in order to furnish a signal corresponding to the magnitude only. Since fading between the main luminance signal generated in comb filter 37, 38, 39 and the low frequency luminance signal at the output of low-pass filter 46 does not require as fine a quantizing as is required for transmission of the video signal, the number of quantizing stages can be reduced at this point. The digital circuits used to carry out the fade-in fade-out between the two luminance signals can then be constructed in a more simple fashion. These will be described in greater detail below. In practice it has been found that a quantizing of four bits is sufficient. A filter 62 may be provided for supressing undesired high frequency components.

As was explained with reference to lines (a+b) and (a−b) on FIG. 3, if correlation exists between two sequential lines a luminance signal without chrominance components is generated by comb filter 37, 38, 39 and the scanning circuits 42 and 43, as is a correlation signal whose value is 0. Lines (a+b)' and (a−b)' of FIG. 3 illustrate that for two noncorrelating lines chrominance components appear in the luminance signal (crossluminance) and the correlation signal has a value differing from 0. For example let it be assumed that the difference of the color difference signals in line b is double that of line a and that the sum of the color difference signals in line b is double that in line a.

The values given in lines (a+b)' and (a−b)' result. These illustrate that on the one hand the luminance signal contains undesired chrominance components and that on the other hand the correlation signal is not equal to 0. It is now necessary to create a luminance signal from which the chrominance components which were not removed by the comb filter are eliminated.

The circuit of FIG. 2 differs from that of FIG. 1 in that the low frequency luminance signal is derived independently of the comb filter whether the two sequential lines correlate or do not correlate. For this purpose a D flip-flop 45 is connected to the output of delay circuit 37. D flip-flop 45 is also triggered with twice the chrominance subcarrier frequency. The output signal of this D flip-flop still contains the chrominance components. The higher frequency range which contains the chrominance components is eliminated in a digital low-pass filter 46 which of course also supresses the high frequency components of the luminance signal. The remaining low frequency components of the luminance signal are applied to adder circuit 47. The output of adder circuit 47 is a terminal 48 which constitutes the output of the system shown in FIG. 2.

Adder circuit 47 adds the high frequency components of the luminance signal to the low frequency components. The high frequency components (herein referred to as the high frequency luminance signal) are derived from the output of the comb filter if correlation exists. For this purpose a digital bandpass filter is connected to the output of D flip-flop 42. Bandpass filter 49 furnishes output signals which contain those higher frequency components of the luminance signal which are supressed by digital low-pass filter 46. These high frequency components are applied to one input of a multiplier circuit 50 in which they are multiplied with the complementary value $(1-x)$ of the correlation signal x. The product is applied to adder circuit 47 through a further adder circuit 51. Multiplier circuit 50, adder circuit 51 and a further multiplier circuit 52 together constitute a fade-in fade-out circuit.

If correlation exists between two sequential lines, the correlation signal $x=0$, so that the output signals of digital bandpass filter 49, that is the higher frequency components of the luminance signal are transmitted at full amplitude by multiplier circuit 50 and adder circuits 51 and 47. When, however, the correlation is not complete and the correlation signal x differs from 0, the higher frequency components of the luminance signals which are derived from the comb filter and digital bandpass 49 are weakened in multiplier circuit 50 and finally completely supressed. Substituted for these higher frequency components are so to speak artificially created higher frequency components which are derived from the low frequency part of the luminance signal with the aid of aperture correction circuit 53.

The chrominance signals can also be derived in the circuit of FIG. 2. For this purpose the difference between signals of two sequential lines (i.e. the signal at the output of circuit 41) is applied to a further D flip-flop which is also clocked by a signal of twice the chrominance subcarrier frequency. The output signals of D flip-flop 54 are applied to a digital bandpass filter 55 to whose output is connected a digital clamping demodulator 56. Demodulated chrominance signals in digital form appear at the output of demodulator 56, that is on a line by line basis the difference and the sum of the chrominance signals will appear alternately. The high frequency components resulting from the demodulation are filtered out by a digital low-pass filter 57. The output of filter 57 is applied to a multiplier circuit 58 whose output is a terminal 59. The output signals of aperture correction circuit 53 are compared to the output signals of circuit 51 in a subtraction circuit 60. The output signal of subtraction circuit 60 is applied to a circuit 61 which generates a signal corresponding to the magnitude of the applied signals similarly as does circuit 44. Again, the number of bits in the signal may be decreased at this point. The signal at the output of circuit 61 thus corresponds to the magnitude of the difference between the higher frequency components of the luminance signal at terminal 48 and the aperture correction signal. This signal affects the amplitude of the chrominance signals in such a way that the chrominance signals are not weakened when the higher frequency components of the luminance signal correspond to the aperture correction signal. This causes a decrease in the so-called cross-chrominance disturbances.

Typical Values for the Filters Used in the Present Invention are as follows

High and low cutoff frequencies of digital filter 49:
  $fc_L = f_F - 1$ MHz
  $fc_H = f_F + 1$ MHz
Cutoff frequency of digital filter 46:
  $fc = f_F - 1$ MHz
High and low frequency cutoff of digital filter 55:
  $fc_L = f_F - 1$ MHz
  $fc_H = f_F + 1$ MHz
Cutoff frequency of digital filter 62:
  $fc = 3 \ldots 6$ MHz
Cutoff frequency of digital filter 57:
  $fc = 1$ MHz

*Note: $f_F$=color subcarrier

Various changes and modifications may be made within the scope of the inventive concepts.

I claim:

1. In a color television system having a composite color television signal including a luminance signal having high and low frequency components, a chrominance subcarrier, and chrominance signals quadrature-modulated on said chrominance subcarrier, a method for separating said luminance signal from said chrominance signals, comprising the steps of
    filtering said composite color television signal to create a low frequency and a main luminance signal having, respectively, only said low frequency components and at least said high frequency components of said luminance signal;
    creating a correlation signal indicative of the degree of correlation between time sequential lines in said composite color television signal;
    and combining said low frequency luminance signal and said main luminance signal in a ratio controlled by said correlation signal thereby creating a final luminance signal substantially free of chrominance signal components.

2. A method as set forth in claim 1, wherein said step of combining said main and low frequency luminance signals comprises the step of fading-in and fading-out between said main and low frequency luminance signals under control of said correlation signals.

3. A method as set forth in claim 1, wherein said step of creating a correlation signal comprises the step of creating a difference signal corresponding to the difference between signal contents of time sequential lines of said color television signal.

4. A method as set forth in claim 3, wherein said step of creating said correlation signal further comprises the step of synchronously demodulating said difference signal and creating a difference amplitude signal corresponding to the magnitude of the so-demodulated difference signal, said difference amplitude signal constituting said correlation signal.

5. A method as set forth in claim 1, comprising the step of creating substitute high frequency signals in response to said low frequency luminance signals; and wherein said step of combining said low frequency luminance signal and said main luminance signal comprises first combining said main luminance signal and said substitute high frequency signals in a ratio controlled by said correlation signal thereby creating a combined signal, and adding said low frequency luminance signal to said combined signal.

6. A method as set forth in claim 4, further comprising the step of creating said chrominance signals in response to said difference signals.

7. A method as set forth in claim 6, wherein said step of creating a chrominance signal comprises synchronously demodulating said difference signal with a chrominance subcarrier of 45° phase angle.

8. In a color television system having a composite color television signal including a luminance signal having high and low frequency components, a chrominance subcarrier, and chrominance signals quadrature-modulated on said chrominance subcarrier, a system for furnishing a final luminance signal having no undesired chrominance signal components, comprising
filter means (2, 4) having an input connected to receive said composite color television signal for furnishing a main luminance signal having at least said high frequency components of said luminance signal at a first filter output, a difference signal indicative of the difference in signal content between selected lines of said color television signal at a second filter output and a low frequency luminance signal having only said low frequency components of said luminance signal at a third filter output;
and combining means (7, 8, 9) having a first input connected to said first filter output, a second input connected to said third filter output and a control input connected to said second filter output for combining said main luminance signal and said low frequency luminance signal in a ratio varying under control of said difference signal, the so-combined luminance signals constituting said final luminance signal.

9. A color television system as set forth in claim 8, wherein said filter means comprises a comb filter.

10. A color television system as set forth in claim 9, wherein said combining means comprises a fade-in fade-out circuit having a control input for receiving a correlation signal;
further comprising correlation signal furnishing means interconnected between said second filter output and said control input of said fade-in fade-out circuit for furnishing said correlation signal in response to said difference signal.

11. A color television system as set forth in claim 10, wherein said fade-in fade-out circuit comprises a first multiplier stage (8) for multiplying said low frequency luminance signal by a factor x, a second multiplier stage (7) for multiplying said main luminance signal by a factor (1−x), each of said multiplier stages having a control input for varying said factor under control of said correlation signal, said fade-in fade-out circuit further comprising adder means for adding the so-multiplied luminance signals.

12. A color television system as set forth in claim 8, further comprising means (12) for delaying said composite color television signal by one line, low-pass filter means (13) connected to said delay means, and horizontal aperture correcting means (14) connected to said low-pass filter means for furnishing horizontal contour enhancement signals to said second input of said fade-in fade-out circuit.

13. A color television system as set forth in claim 8, further comprising vertical aperture correcting means (20) connected to said first filter output for furnishing aperture corrected luminance signals;
and wherein said adder means further comprises means for adding said aperture corrected luminance signals to said combined luminance signals to constitute said final luminance signal.

14. A color television system as set forth in claim 10, wherein said correlation signal furnishing means comprises means (16) for synchronously demodulating said difference signal under control of a chrominance subcarrier having a predetermined phase angle, and means (18) connected to said synchronous demodulating means for furnishing a magnitude signal indicative of the magnitude of the so-demodulated difference signal and independent of the sign thereof.

15. A color television system as set forth in claim 8, further comprising means (22) connected to said second filter utput for synchronously demodulating said difference signal under control of a chrominance subcarrier having a predetermined phase angle so that the sum and difference of said chrominance signals is furnished alternately for sequential lines of said color television signal.

16. A color television system as set forth in claim 8, wherein said filter means comprises digital filter means;
further comprising analog/digital converter means connected to receive said composite color television signal and furnish a digital color television signal to said digital filter means in response thereto.

17. A color television system as set forth in claim 16, wherein said digital filter means comprises means (37) for delaying said digital color television signals thereby creating delayed digital signals, means (38) for adding said delayed digital signals to said digital color television signals and furnishing sum signals corresponding to the sum of the so-added signals, means (39) for subtracting said delayed digital signals from said digital color television signals thereby creating subtraction signals corresponding to the difference between so-subtracted signals, and first and second selection means (42, 43) for, respectively, selecting alternate ones of said sum signals and alternate ones of said subtraction signals for furnishing said main luminance signal and said difference signal, respectively.

18. A color television system as set forth in claim 17, wherein said first and second selection means comprises a D flip-flop clocked at a frequency equal to two times said chrominance subcarrier frequency.

19. A color television system as set forth in claim 16, further comprising means (44) for furnishing a magnitude signal corresponding to the magnitude of said difference signal and independent of the sign thereof connected between said second selection means and said control input of said combining means.

20. A color television system as set forth in claim 17, wherein said digital filter means further comprises low-pass filter means (46) for furnishing said low frequency luminance signal;

further comprising means (53) connected to said low-pass filter means for furnishing substitute high frequency signals in response to said low frequency luminance signal;

and wherein said combining means comprises first combining means (50, 51, 52) for combining said main luminance signal and said substitute high frequency signals in a ratio controlled by said correlation signal, and second combining means for adding said low frequency luminance signal to the so-combined signals, thereby creating said final luminance signal.

* * * * *